United States Patent
Das et al.

(10) Patent No.: US 10,481,239 B2
(45) Date of Patent: Nov. 19, 2019

(54) INDOOR ROOM-LOCALIZATION SYSTEM AND METHOD THEROF

(71) Applicant: Robert Bosch GmbH, Stuttgart (DE)

(72) Inventors: Samarjit Das, Sewickley, PA (US); Joao Pedro De Sousa, Pittsburgh, PA (US)

(73) Assignee: Robert Bosch GmbH, Stuttgart (DE)

(*) Notice: Subject to any disclaimer, the term of this patent is extended or adjusted under 35 U.S.C. 154(b) by 68 days.

(21) Appl. No.: 16/066,566

(22) PCT Filed: Jan. 2, 2017

(86) PCT No.: PCT/EP2017/050015
§ 371 (c)(1),
(2) Date: Jun. 27, 2018

(87) PCT Pub. No.: WO2017/114967
PCT Pub. Date: Jul. 6, 2017

(65) Prior Publication Data
US 2018/0356491 A1    Dec. 13, 2018

Related U.S. Application Data
(60) Provisional application No. 62/273,676, filed on Dec. 31, 2015.

(51) Int. Cl.
| | |
|---|---|
| *H04W 12/00* | (2009.01) |
| *G01S 5/02* | (2010.01) |
| *H04W 64/00* | (2009.01) |
| *H04W 4/33* | (2018.01) |
| *G01S 11/06* | (2006.01) |

(52) U.S. Cl.
CPC ............. *G01S 5/0252* (2013.01); *G01S 11/06* (2013.01); *H04W 4/33* (2018.02); *H04W 64/00* (2013.01)

(58) Field of Classification Search
CPC ........ G01S 5/0252; G01S 11/06; H04W 4/33; H04W 12/00503
See application file for complete search history.

(56) References Cited

U.S. PATENT DOCUMENTS

| | | | |
|---|---|---|---|
| 9,503,855 B2* | 11/2016 | Chen | H04W 64/00 |
| 2012/0078821 A1* | 3/2012 | Ma | G06N 3/088 |
| | | | 706/12 |
| 2015/0154850 A1* | 6/2015 | Fadell | G06Q 10/083 |
| | | | 340/501 |

(Continued)

OTHER PUBLICATIONS

International Search Report corresponding to PCT Application No. PCT/EP2017/050015 dated May 4, 2017 (3 pages).

(Continued)

*Primary Examiner* — Charles N Appiah
*Assistant Examiner* — Xiang Zhang
(74) *Attorney, Agent, or Firm* — Maginot Moore & Beck LLP

(57) ABSTRACT

A processor-based client device may be localized in an indoor area based on Received Signal Strength Indication (RSSI) values from different access points is provided. A general geographic area in which the processor-based client device is located. A position of the processor-based client device on the identified area is determined. A context-aware information is displayed on the processor-based client device once the identified area is determined.

6 Claims, 13 Drawing Sheets

(a) Schematic of the training process    (b) Schematic of the testing process

(56) References Cited

U.S. PATENT DOCUMENTS

2015/0237480 A1* 8/2015 Fang ............... H04W 4/04
 455/456.6
2016/0278039 A1* 9/2016 Persson ............... G01S 5/0294
2016/0371662 A1* 12/2016 Fine ............... G06Q 20/102

OTHER PUBLICATIONS

Xiaoqing Lu, et al., "A novel algorithm for enhancing accuracy of indoor position estimation", Proceeding of the 11th World Congress on Intelligent Control and Automation, IEEE, Jun. 29, 2014, pp. 5528-5533.
Zhao Jin, et al., "Development of Indoor Localization System for Elderly Care Based on Device-Free Passive Method", 2015 Sixth International Conference on Intelligent Systems Design and Engineering Applications (ISDEA), IEEE, Aug. 18, 2015, pp. 328-331.
Jorg Schafer, et al., "Practical concerns of implementing machine learning algorithms for W-LAN location fingerprinting", 2014 6th International Congress on Ultra Modern Telecommunications and Control Systems and Workshops (ICUMT), IEEE, Oct. 6, 2014, pp. 310-317.

\* cited by examiner

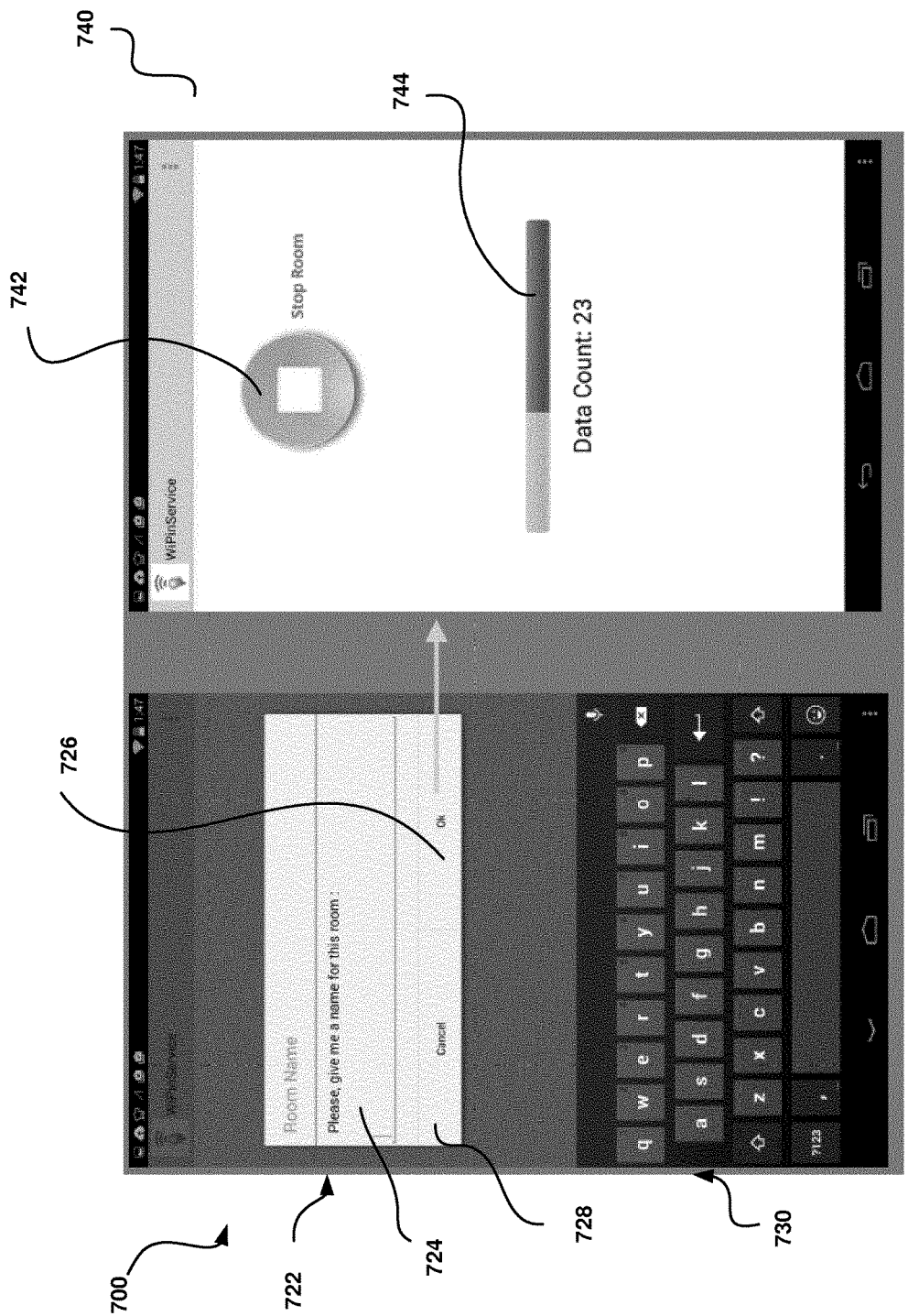

INDOOR ROOM-LOCALIZATION SYSTEM AND METHOD THEROF

CROSS-REFERENCE TO RELATED APPLICATION

This application is a 35 U.S.C. § 371 National Stage Application of PCT/EP2017/050015, filed on Jan. 2, 2017, which claims the benefit of priority to a U.S. provisional patent application Ser. No. 62/273,676, filed Dec. 31, 2015, the contents of which are incorporated herein by reference as if fully enclosed herein.

FIELD

The patent relates generally to indoor room-localization systems and methods for monitoring objects based on location and event.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to an indoor room localization system comprises a memory including training data and response data, and a processor coupled to the memory, the processor for carrying or having computer-executable instructions to collect WiFi RSSI data corresponding to various sites, the instructions causing a machine to classify the collected WiFi RSSI data into an array of RSSI patterns and transmit the classified RSSI patterns to the memory for storing into training data. The instructions further causing a machine to differentiate training data and the response data stored in the memory. Either a dirichlet distribution or support vector machine (SVM) is used to classify the collected WiFi RSSI data into an array of RSSI patterns. In one embodiment, the processor is integrated into a client device and the memory is located on a cloud network.

According to another exemplary embodiment of the disclosure, a method for performing an indoor room localization of an object comprises receiving first WiFi RSSI data from a first region, receiving second WiFi RSSI data from a second region, identifying a location of the object, scanning for WiFi RSSI data in the location of the object and comparing the scanned WiFi RSSI data with the first and second WiFi RSSI data, wherein the scanned WiFi RSSI is not associated with at least one of the first or second WiFi RSSI data. The scanned WiFi RSSI is stored in a memory as a third WiFi RSSI data.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein:

FIGS. 7A-7B illustrate another GUI according to an embodiment of the disclosure;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

A processor-based client device may be localized in an indoor area based on Received Signal Strength Indication (RSSI) values from different access points. For efficiency, the localization may be performed in stages. In a first stage, a general geographic area in which the processor-based client device is located. In a second stage, a position of the processor-based client device on the identified area is determined. In a third stage, context-aware information is displayed on the processor-based client device once the identified area is determined. It should be understood that the localization operations do not have to be performed in the precise order described above. To the contrary, various stages can be handled in a different order or simultaneously.

Figure 1:
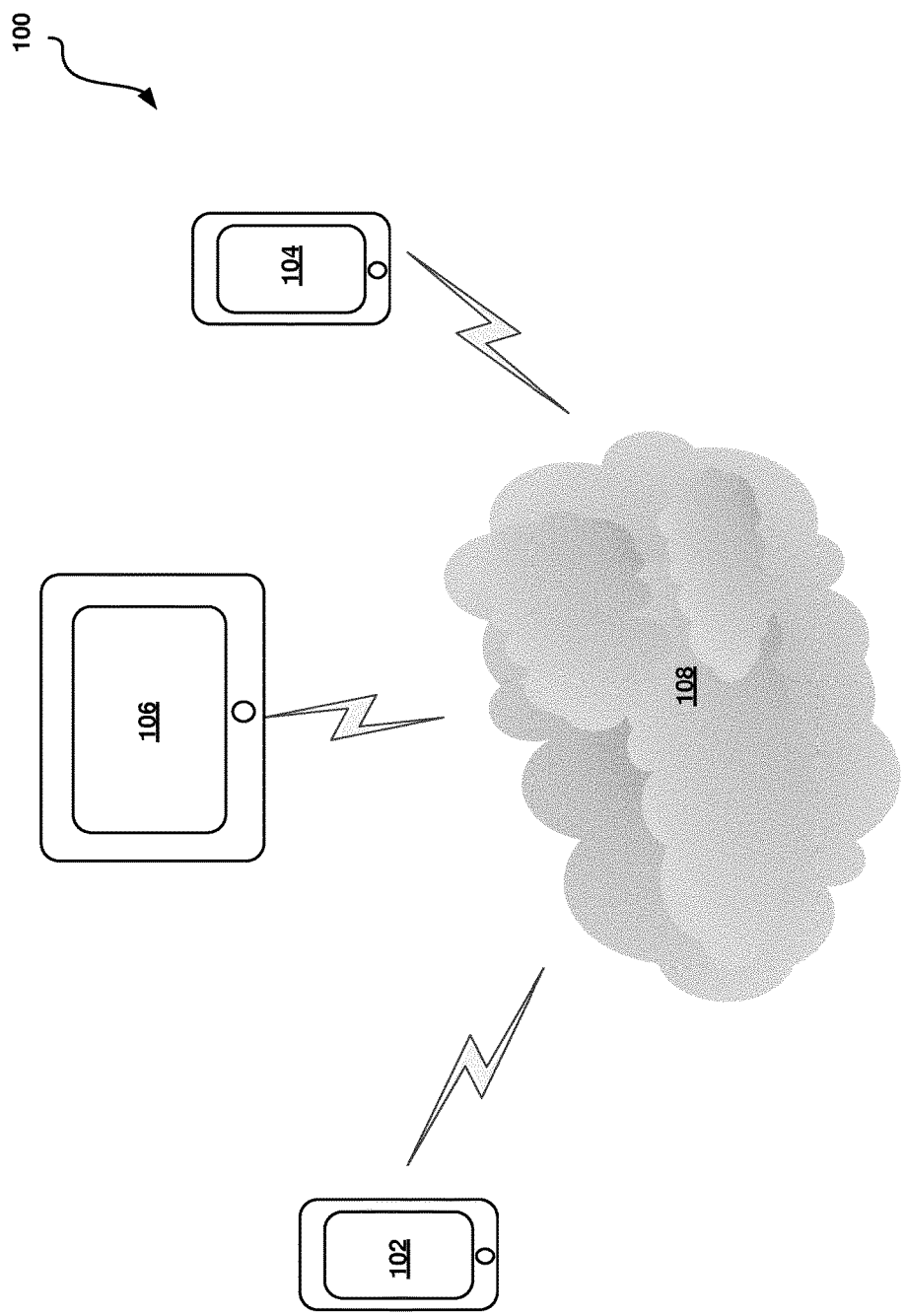
FIG. 1 is a functional diagram representing a system configured to perform the various processes disclosed herein, in accordance with an exemplary embodiment.

Now referring to FIG. 1, a system 100 in accordance with an exemplary embodiment includes a processor-based client device, three client devices 102, 104, 106 are illustrated, and a network 108. The client devices 102, 104, 106 may be a personal computer intended for use by a person. For example, the client device may be a wireless-enabled tablet, a cellular phone, a personal digital assistant, a wearable device, or other portable electronic device that sends and receives data using a wireless data connection to the network 108. Although only a few client devices are depicted, it should be appreciated that a typical system can include a large number of connected client devices. The network 108 may comprise various configurations and use various protocols including the Internet, World Wide Web, intranets, cloud networks, virtual private networks, local Ethernet networks, private networks using communication protocols proprietary to one or more companies, cellular and wireless networks such as WiFi, WiMax, instant messaging, HTTP, SMTP, one or more local area networks (LANs), wide area networks (WANs), and various combinations of the foregoing.

Figure 2:
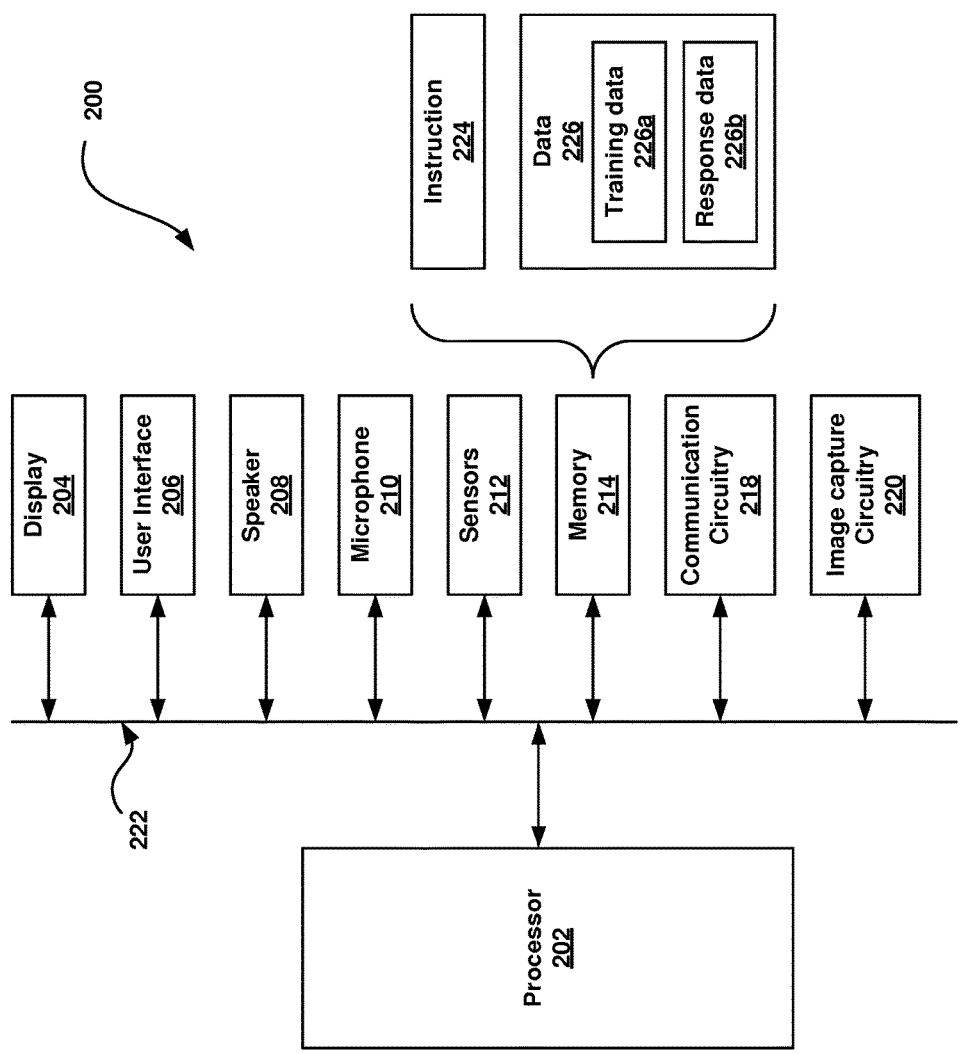
FIG. 2 is a block diagram of a representative processor-based client device that may be used to perform the various processes disclosed herein, in accordance with the described embodiment.
Figure 3:
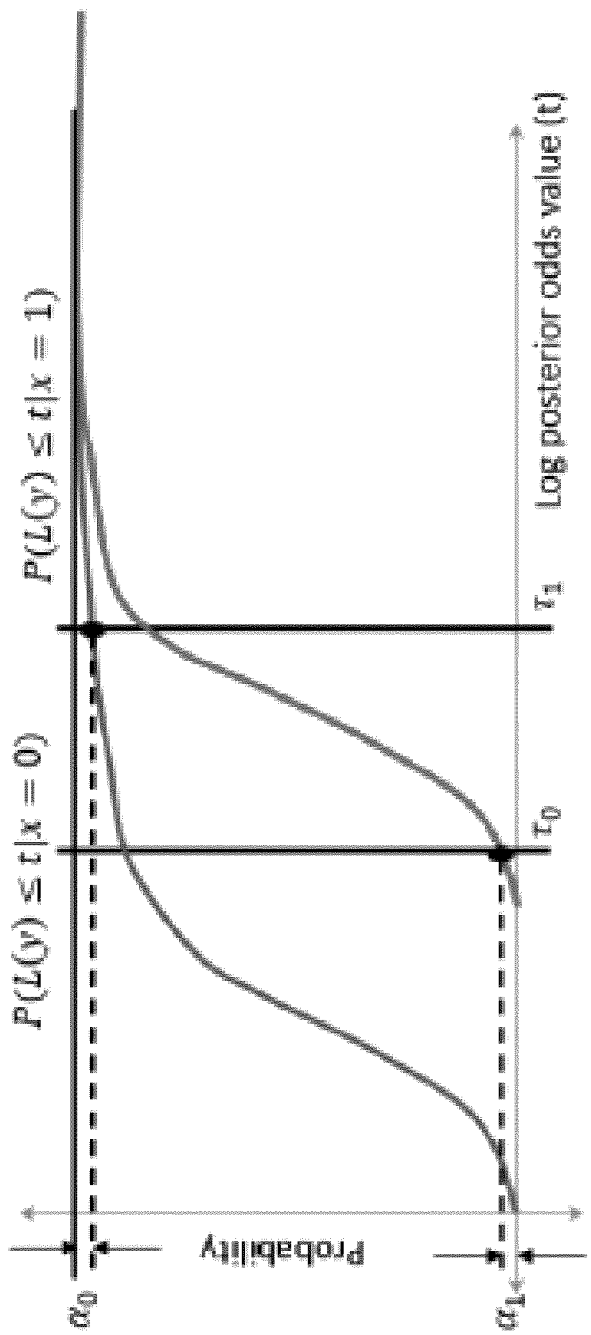
FIG. 3 is a graph of a representative region of overlap model, in accordance with an exemplary embodiment.

FIG. 2 depicts a processor-based client device 200 in accordance with an exemplary embodiment of the disclosure. The client device 200 may be a personal computer intended for use by a person. The client device 200 may include a processor 202, a display 204, a user interface 206, a speaker 208, a microphone 210, sensors 212, a memory 214, a communication circuitry 218, an image capture circuitry 220, and a communication bus 222. The processor 202 may execute instructions necessary to carry out or control the operation of many functions performed by the client device 200. In one embodiment, the processor 202 may be a system-on-chip such as those found in mobile devices and include one or more dedicated graphic processing units (GPUs). In another embodiment, the processor 202 may be based on reduced instruction-set computer (RISC) or complex instruction-set computer (CISC) architectures or any other suitable architecture and may include one or more processors. The user interface 206 can take a variety of forms, such as a button, keypad, a click wheel, a keyboard, a display screen, a touch screen, a biometric lens, or the like. The display 204 may be a display screen or a touch screen which forms as part of the user interface 206.

The sensors 212 may include proximity sensor, ambient light sensor, thermal sensor, accelerometer, gyroscope, navigation sensor, motion sensor, location sensor, and various sensors of the foregoing. The memory 214 includes instructions 224 used/executed by the processor 202 to perform device functions. The instructions 224 may be any set of instructions to executable either directly or indirectly by the processor 202. The instructions 224 may be stored in object code format for direct processing by the processor 202, or in any other computer language including scripts or collections of independent source code modules that are interpreted on demand or compiled in advance. The memory 214 also includes data 226 that may be retrieved, manipulated, stored by the processor 202. The data 226 may include training data 226a and response data 226b. Detailed information of the training data 226a and the response data 226b will be discussed below. For example, the memory 214 may be memory cache, read-only memory (ROM), random access memory (RAM), arrays of magnetic disc drives, solid-state storage devices, and the like. The image capture circuitry 220 may capture still and video images that be processed to generate images.

It should be understood that the following operations do not have to be performed in the precise order described below. To the contrary, various steps can be handled in a different order or simultaneously.

In one embodiment, the processor-based client device 200 collects WiFi RSSI data corresponding to different rooms/regions in a specific geographic area. For example, the rooms or regions may be living room, bed room, kitchen, study room, and the like. The geographic area, for example, may be home, office, factory, store, and the like. The collected dataset, i.e. training data 226a is stored in the memory 214 of the client device 200. Once the training data 226a is stored, the processor 202 that contains sequences of computer executable intructions 224 uses a pattern classification algorithm to learn RSSI patterns for different rooms/regions and stores the learnt parameters for differentiating the patterns in the memory 214. The processor 202 also computes statistical parameters that allows for discrimination/classification of different sources even with a data sample coming outside the input dataset but generated from one of the data sources/classes. The pattern classification algorithm may be support vector machine (SVM). The process of learning the classification parameter is known as "training the SVM". Once this learning process is completed, the user, then walks into different rooms/regions and the processor-based client device 200 returns to the localization stages where the device 200 identifies and classifies the incoming WiFi RSSI patterns in real-time into one of the learnt patterns corresponding to various rooms. WiFi RSSI data from different rooms (i.e. sources or classes) and the SVM can learn those statistical parameters based on the data to classify RSSI data coming from a particular room at any point once the training is done i.e. in the post-training phase, the data samples outside the training dataset can be classified to be coming from a particular source/class.

This section provides the complete formulation of the developed technique and the schematics for the algorithms. Let $Y \in \mathcal{Y}$ be the random vector of signal strength measurements from D different access points and $\mathcal{Y} \subsetneq \mathbb{Z}^D$ be the set of all possible such vectors of integers. Let $l \in \mathcal{L}$ be the level of fidelity of semantic labels associated with the classes of interest and $\mathcal{L} = \{1, 2, \ldots, L\}$, where L denotes the finest level of localization. There exists a hypothesis set $\chi_l$, which includes all the semantic labels for classes of interest having the level of fidelity of l. These class labels are provided by the user or by some agent who trained the system in that particular site. For every label x in the hypothesis set $\chi_l$, the corresponding measurements can be used to estimate a parametric/nonparametric density model to obtain the generative model for that class of interest. Generative models need many samples in order to be able to correctly characterize the measurement density and parametric models like GMM need several sample and multiple runs to estimate the number of components. On the other hand, discriminative models can be obtained as one versus all classifiers for any arbitrary distribution of data and would even work for relatively smaller datasets. In other words, the overlap modeling technique explained ahead can be used for discriminative as well as generative models, but in this work, we have used discriminative models.

Figure 10:
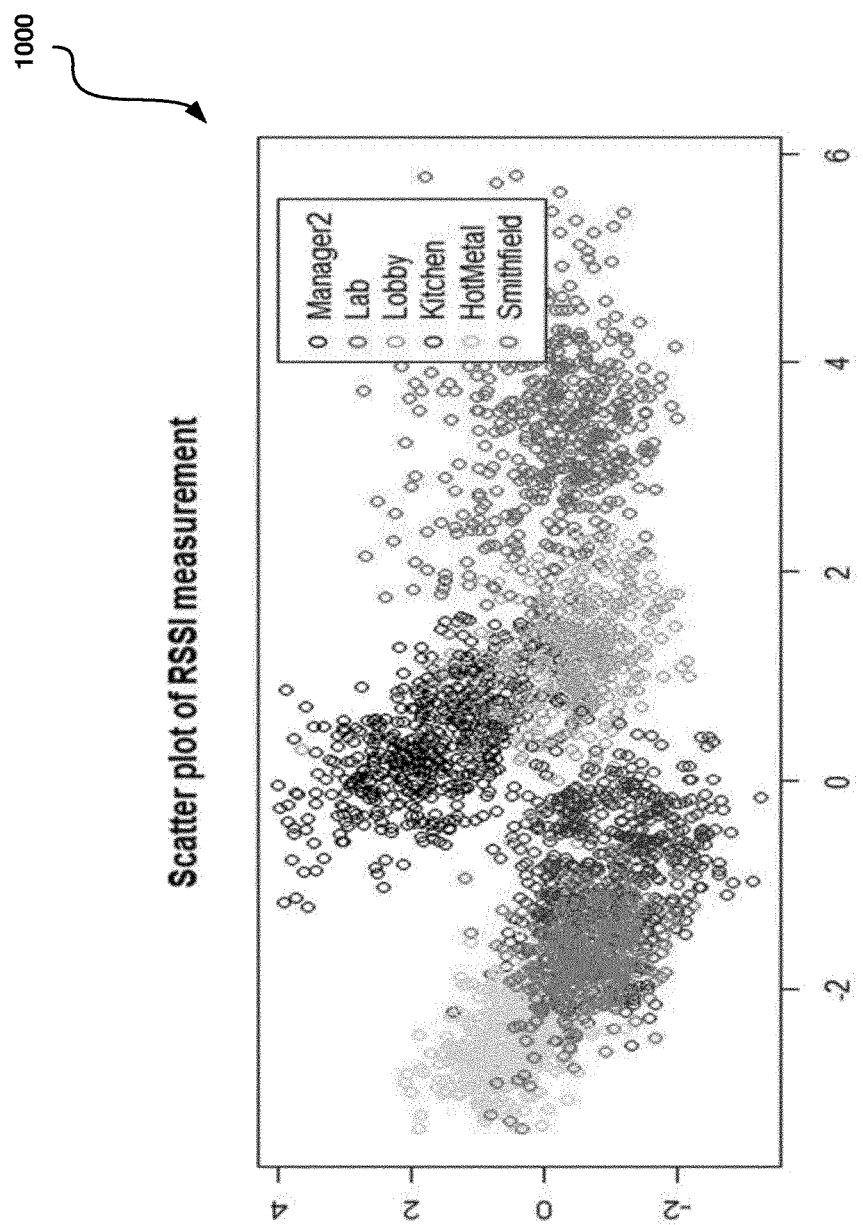
FIG. 10 depicts a scatter plot with data obtained from different rooms according to one described embodiment of the disclosure.
Figure 11A:
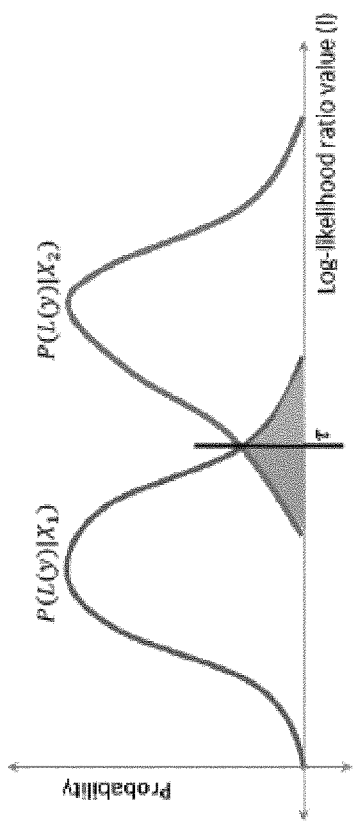
FIGS. 11A and 11B depict scatter plot with data obtained from different rooms according to one described embodiment of the disclosure.
Figure 11B:
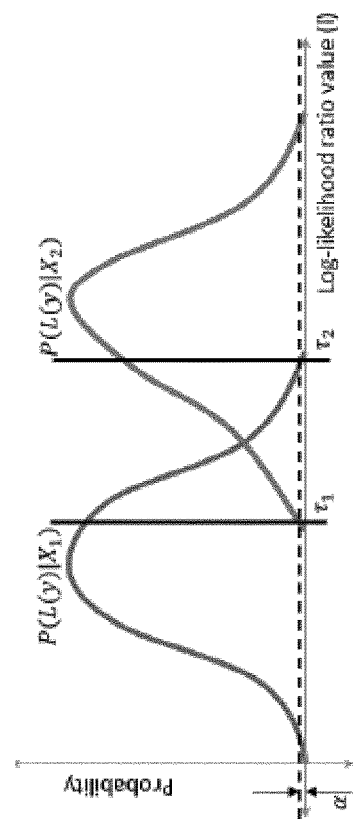
Figure 12:
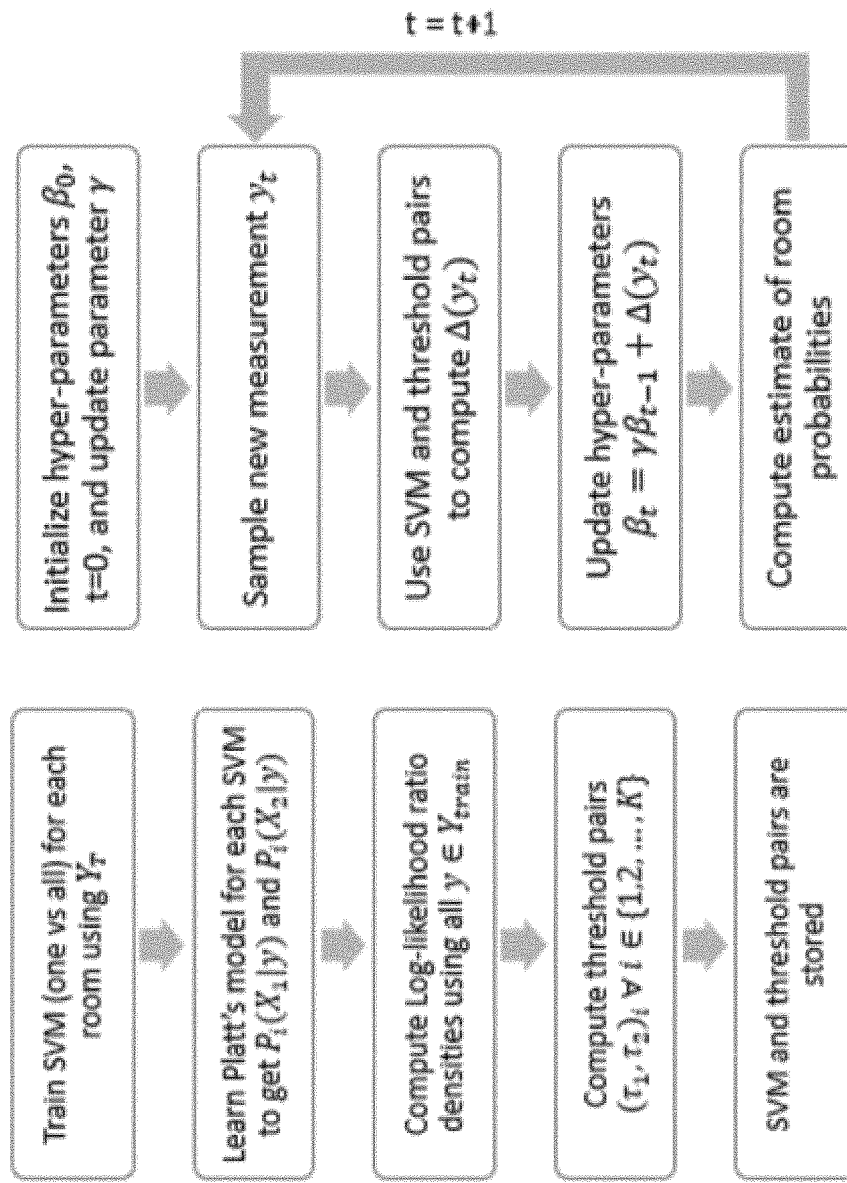
FIG. 12 depicts a flow chart a process for testing and training performed by the system in accordance to one described embodiment of the disclosure.

The training data 226a may be used to generate one or more indoor localization models. FIG. 10 depicts a scatter plot 1000 with data obtained from different rooms according to an exemplary embodiment of the disclosure. As shown in the plot 100, there is a significant overlap among rooms in the RSSI space (overlapping circles with different colors). For example, Smithfield room overlaps a portion of both the kitchen and other rooms. In another example, Manager2 room overlaps a portion of lobby. In yet another example, a portion of kitchen overlaps a portion of lobby. Which is to say, that a simple classification algorithm makes mistakes (i.e. do misclassification) in those overlapping regions. They typically correspond to room transition regions in the physical space. The disclosure includes a method for estimating these regions of overlap and take corrective actions. Typically, once it is detected that a data sample comes from the overlapping region an immediate decision immediately is not necessary. Instead, decisions from successive instances to fuse them together to give a more confident decision about what class the current data samples come from (in this case, different classes corresponds to different rooms) can be performed later. Below is a detailed description of the sequential decision fusion section.

$$L(y) = \frac{P(x=1 \mid y)}{P(x=0 \mid y)}$$

as the likelihood ratio of a data sample y belonging to a certain class (denoted as x=1) or the other class (denoted as x=0) is defined. In FIGS. 11A and 11B, the diagrams illustrate the log-likehood value (i.e. values of L(y)) in the x-axis and in the y-axis, plotted P(L(y)|Class 1) and P(L(y)|Class 2 i.e. $X_2$) together. P(L(y)|Class 1 i.e. $X_1$) means the probability of log-likelihood being L(y) conditioned on the data sample y actually generated by class 1. It is clear from the figure that in between log likelihood between $\tau_2$ and $\tau_1$ the corresponding values L(y) indicates that the possibility that data sample y came from either $X_1$ or $X_2$ are competing (with equal probability at $\tau$). Thus likelihood rations between $\tau_2$ and $\tau_1$ are considered to be confusion/overlap region. Given the red and the blue curve, we can compute the $\tau_1$ and $\tau_2$ parameters provided to set an allowable rate of misclassification. This is determined by the parameter $\alpha$—the higher it is, the more are the chances of misclassification i.e. narrower is the estimated confusion region $\tau_2$-$\tau_1$ (means, we are taking more chances of misclassifying class 1 as class 2 or vice versa)

The function which uses the region of overlap to give the response from a classifier may be given as follows:

$$\delta(y) = \begin{cases} 1; & \text{if } L(y) > \tau_1, \\ 0; & \text{if } L(y) < \tau_0, \\ \theta; & \text{if } \tau_0 \le L(y) \le \tau_1, \end{cases}$$

wherein the response θ corresponds to "I don't know" output and it can take values from the closed set [0,1]. The value of θ indicates the probability with which the sample in region of overlap may be considered to be belonging to the class being tested, i.e., x=1 case.

Sequential Decision Fusion

The responses from each classifier for a measurement are collected in an observation vector. The responses can be conclusive or indecisive. For example, in a 3-room localization environment, a conclusive response may be $\Delta(y)$=[1, 0, 0] and an indecisive response may be $\Delta(y)$=[1, θ, 0] or $\Delta(y)$=[1, 1, 0].

A systematic way to fuse the information from such a sequence of observation vectors is needed for a robust classification system. Dirichlet distribution is a conjugate prior of the multinomial and categorical distribution. A categorical distribution is a generalization of the Bernoulli distribution for the case with more than two outcomes and it describes the result of a random event that can take on one of K possible outcomes, with the probability of each outcome separately specified. The observation vectors can be considered to the imperfect observation of the true outcome of the system, i.e., the true location of the user. These observation vectors can be used to update the parameters of the categorical distribution, which specifies the probability that the user is in a particular region. The most likely probability vector which can be obtained from the mode of the Dirichlet distribution is the probability that the user is in a particular region. More formally, if d $\beta$=[$\beta_1$, $\beta_2$, ..., $\beta_K$] are the concentration hyper-parameters representing our prior information and K is the number of classes of interest, then given a model of the probability vector p, which is a parameter of the categorical distribution, as follows:

$$p|\beta = [p_1, p_2, \ldots, p_K] \sim \text{Dir}(K, \beta),$$

$$X|p = [x_1, x_2, \ldots, x_K] \sim \text{Cat}(K, p).$$

Here, X represents the unknown true location of the user, so, if the user is in region 2, then $x_2$=1 and other elements are zero. The following conjugate prior relation is used in sequentially updating the belief:

$$p|X, \beta \sim \text{Dir}(K, \gamma\beta + \Delta(y)),$$

$$\beta^t = \gamma\beta^{t-1} + \Delta(y_t),$$

where $\Delta(y)$ is the observation vector, γ is a belief update parameter which systematically discounts the effect of older measurements on the current estimate of probability. This parameter may be required particularly when the user moves from one region to another and recent observations needs to be given importance to identify the current location. If γ is closer to 1, then previous measurements have significant contribution, whereas, γ closer to 0, implies that previous measurements have no influence. In this implementation, γ was chosen between 0.7 and 0.8. The choice of hyper-parameters to initialize the Dirichlet distribution can be considered to be any non-informative prior, such as, Laplace's prior, Jeffrey's prior, or Perk's prior. This work used the Perk's prior with $\beta_K$=1/K for each k ∈ {1, 2, ..., K}. The estimate of the most likely probability over the regions is given by $\hat{p}$ and it is evaluated as follows:

$$\hat{p} = \arg\max_p P(p \mid X, \beta),$$

$$\hat{p}_i = \frac{\beta_i - 1}{\sum_{j=1}^K \beta_j - K} \, \forall \, i \in \{1, 2, \cdots, K\},$$

$$\hat{x} = \arg\max_{i \in \{1,2,\cdots,K\}} \hat{p}_i.$$

Here, $\hat{x}$ is the estimate of the user location and the result can be set to be declared only if $\max_{i \in \{1,2, \ldots, K\}} \hat{p}_i \ge \sigma$. The choice of σ adds another layer of robustness and the value is chosen to ensure that the result is declared only when no other probability can be close enough to the mode, hence usually $\sigma$ was chosen to be 0.6.

Figures 4A, 4B:
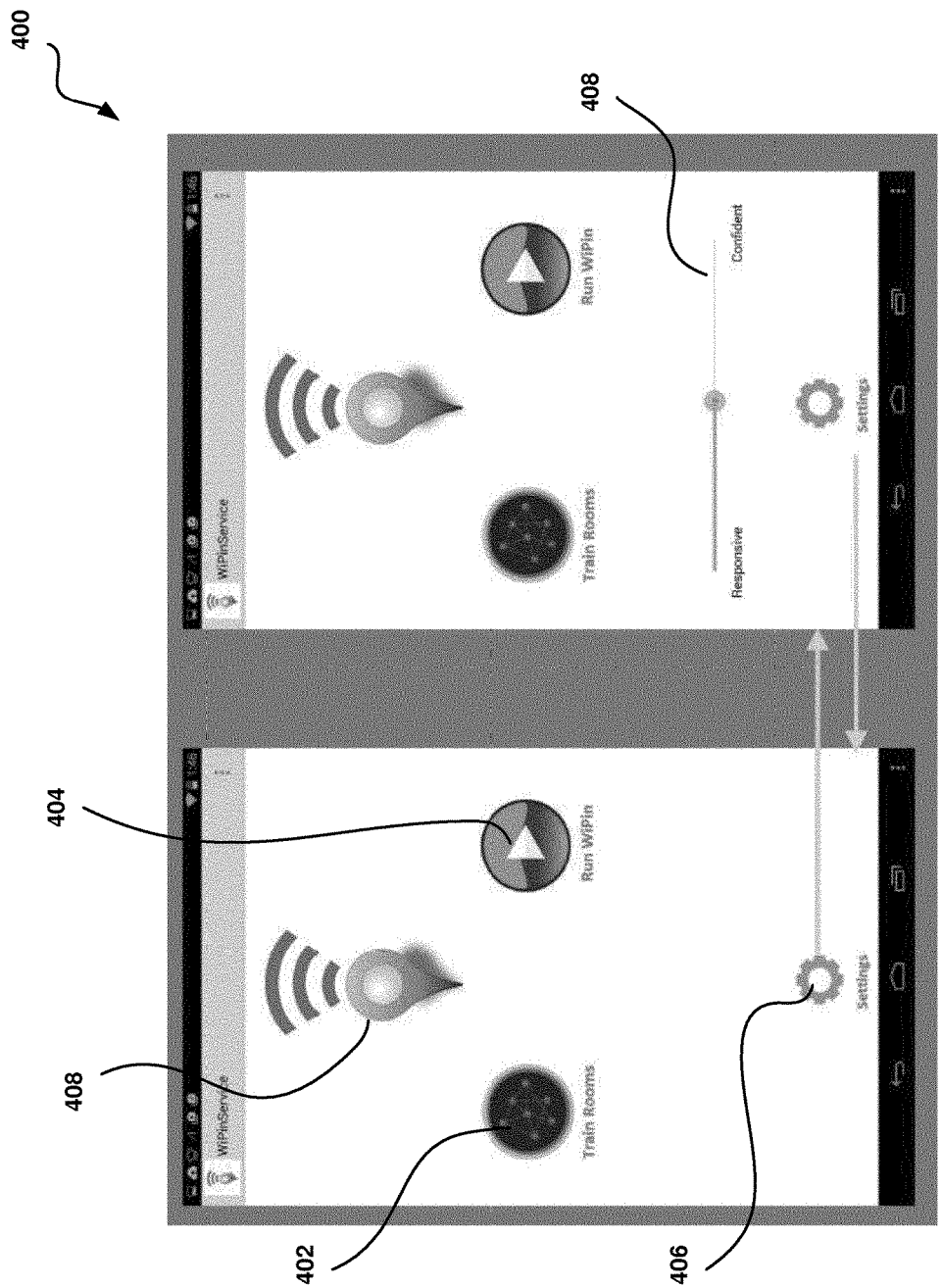
FIGS. 4A-4B illustrate exemplary graphical user interface (GUI) according to an embodiment of the disclosure.

FIGS. 4A-4B illustrate exemplary graphical user interface (GUI) 400 according to an embodiment of the disclosure. The GUI 400 may include various icons, information banner, modules, interface elements, and the like. The icons or modules may be activated by touching with a finger or a stylus and the like on a display 204 or through the user interface 206. The display 204 can be touch sensitive and is able to interpret finger contacts, finger tap gestures, finger swipe gestures, stylus movements, any combination thereof, and the like. It should be understood that, in some embodiments, one or more of the finger inputs are replaced with input from another input device (e.g. a mouse bansed input, styles input, joystick input, or the like). For example, a swipe gesture may be replaced with a mouse click (e.g. instead of a contact) followed by movement of the cursor along the path of the swipe (e.g., instead of movement of the contact). A further embodiment, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

GUI 400 includes icons 402, 404, 406, and 408. Train rooms icon 402 may be used to identify a room of a location WiPin icon 404 when touched or pressed to initiate a scan of a room, a house, an apartment, a building, a factory, an office, or the like. In alternate embodiment, the scan is conducted automatically when the client device enters into an area is identified. The settings icon 406 when touched or pressed brings up various device functions. The GUI 400 further includes an indicator 408 that changes from one form to another. Localization icon 408 shows signal strength when the client device scans for wireless network signals to identify one or more wireless network access point identifies.

Figure 5:
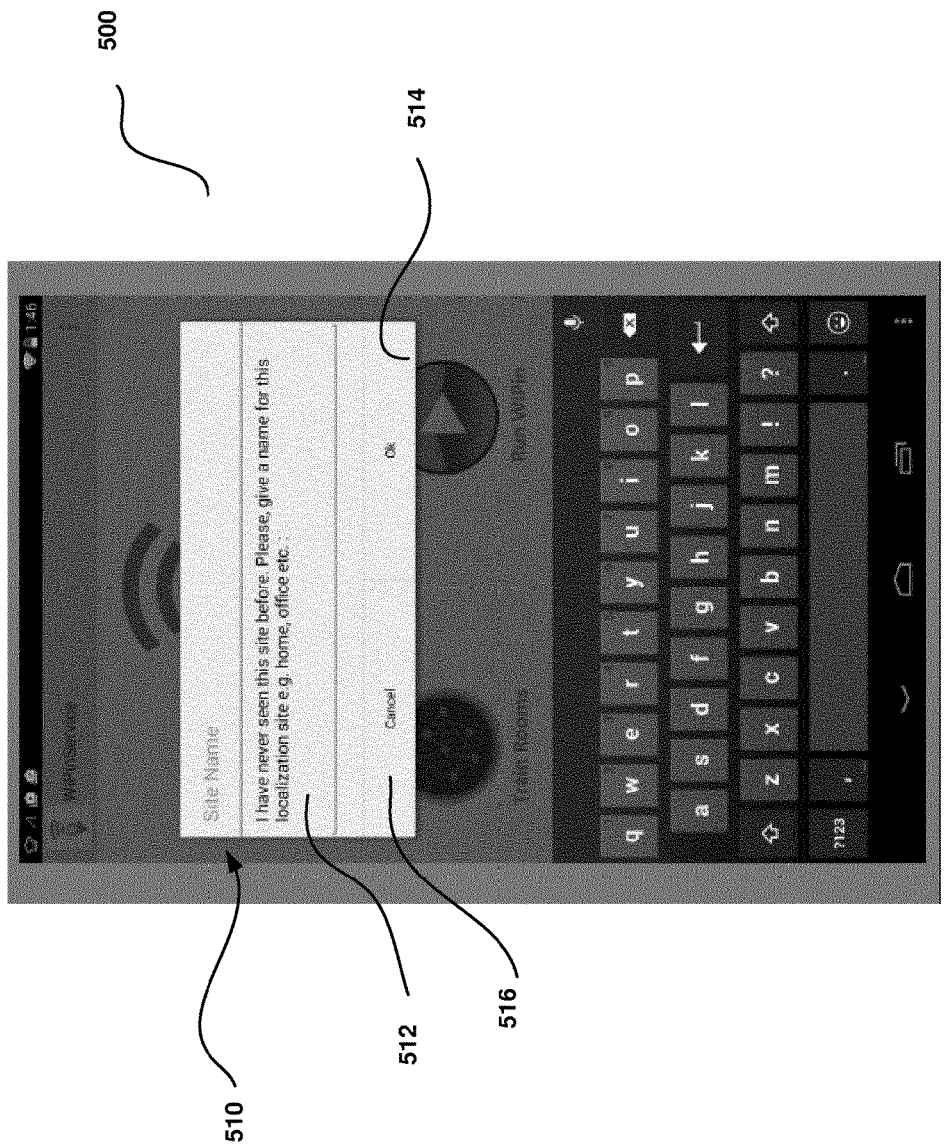
FIG. 5 illustrates another exemplary GUI according to an embodiment of this disclosure.

FIG. 5 illustrates a GUI 500 having a screen window 510 according to an embodiment of the disclosure. The screen window 510 includes a message displaying "a site name: I have never seen this site before. Please, give a name for this localization site, e.g. home, office etc,:" after the scanned operation is completed. The user may be prompted to enter a name for the identified location in the blank field 512 and then pressed or touched "Ok" icon 514 to confirm the entry. In alternate embodiment, the user may press or touch "cancel" icon 516 to exit the screen window 510.

Figures 6A, 6B:
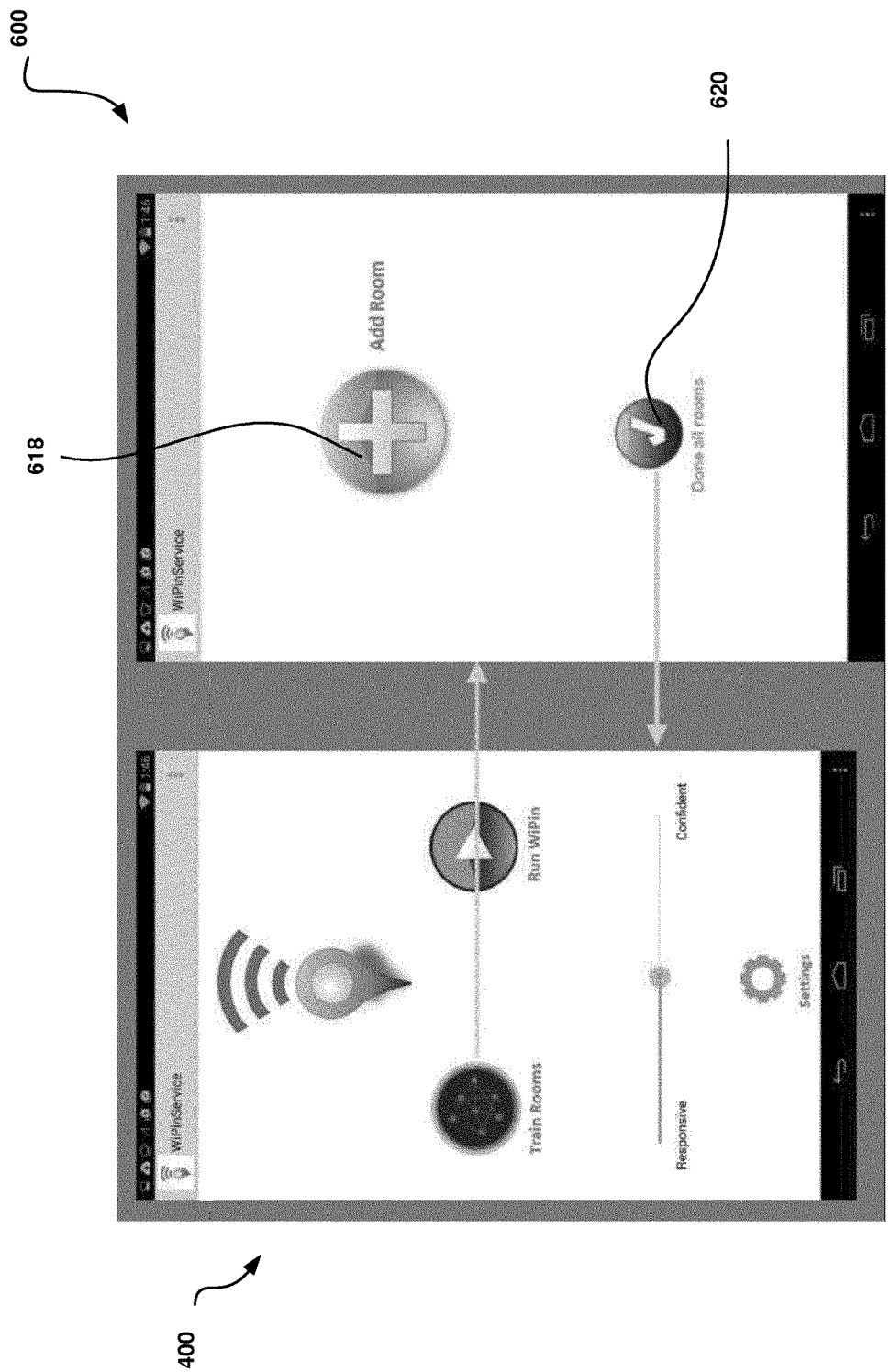
FIGS. 6A-6B illustrate another GUI according to an embodiment of the disclosure.

FIGS. 6A-6B illustrate GUI 400 and GUI 600 according to an embodiment of the disclosure. GUI 400 as depicted in FIG. 6A is similar to GUI 400 of FIG. 4B. Once the location is identified in the previous GUI 500, the user may press or touch the train rooms icon 402 to add a room into the memory. As shown in FIG. 6B, GUI 600 appears and the user may be prompt to press or touch a "add room" icon 618. Until all the desired rooms within the location are added to the memory, the user may press or touch "done all rooms" icon 620.

FIGS. 7A-7B illustrate GUI 700 and GUI 740 according to an embodiment of the disclosure. Every time the user presses or touches "add room" icon 618 as depicted in FIG. 6B, a screen window 722 appears as shown in FIG. 7A. The screen window 722 includes a message displaying "room name: Please, give a name for this room." The user may enter a room name in the blank field 724 and then press or touch "Ok" icon 726 to confirm the entry. In alternate embodiment, the user may press or touch "cancel" icon 728 to exit the screen window 722. An optional virtual keyboard 730, depending the type of client device, may be displayed allowing the user to enter the information. Now referring to FIG. 7B, the GUI 740 includes a "stop room" icon 742 and an indicator 744. The user may touch or press the "stop room" icon 742 at any time to stop adding room to the memory. "Indicator" icon 744 may display the available memory in the client device. The "indicator" icon 744 may also display the number of room stored in the memory.

Figures 8A, 8B:
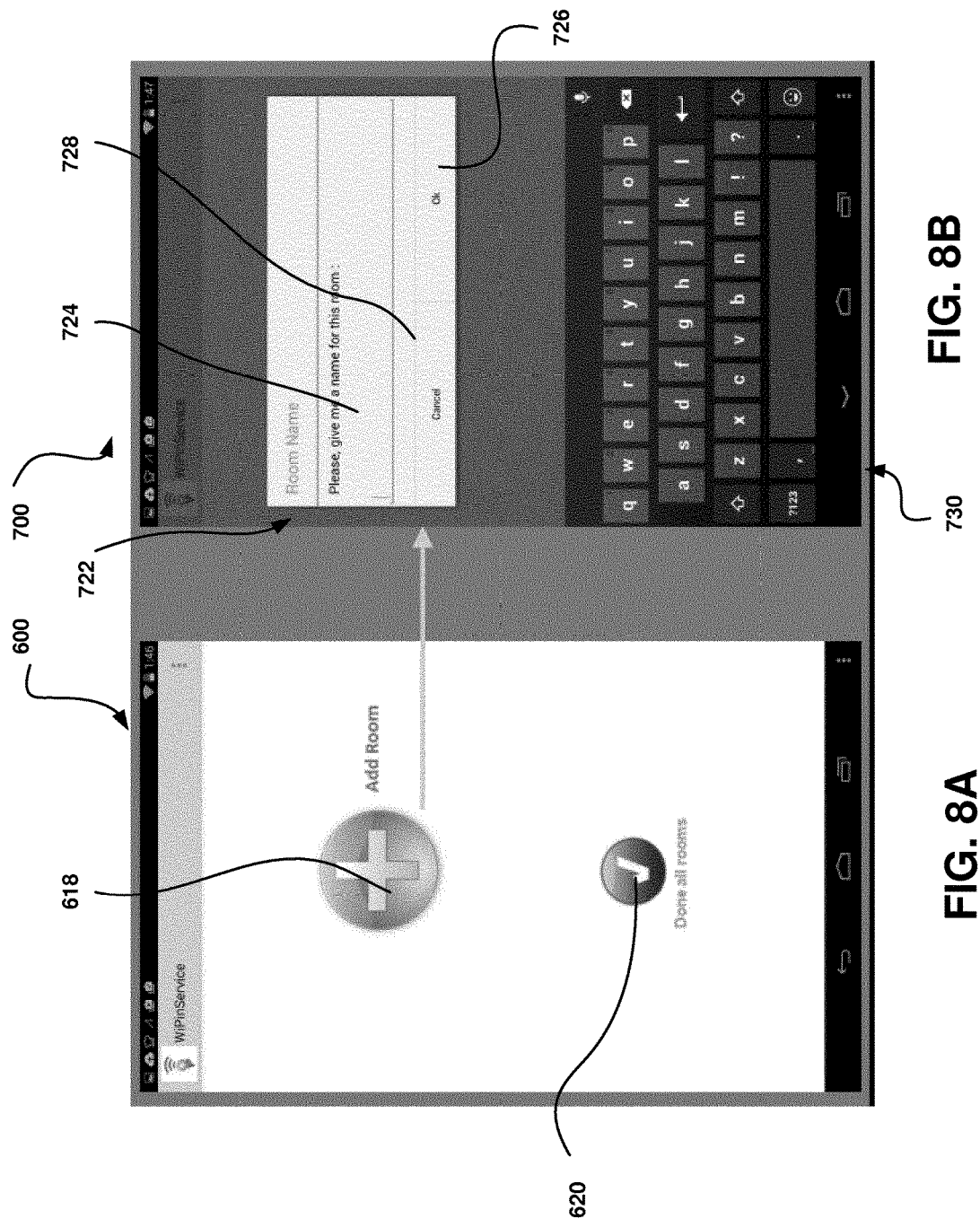
FIGS. 8A-8B illustrate another GUI according to an embodiment of the disclosure.

In alternate embodiment, the user may continue to add room by retrieving the previous GUI 600 as illustrated in FIG. 6B. Now referring to FIG. 8A illustrating GUI 800 identical to GUI 600 of FIG. 6B. User may name a room of the identified location in the blank field 824 as shown in FIG. 8B, similar to the blank field 724 of FIG. 7A, before pressing or touching "Ok" icon 826 to confirm the entry. In alternate embodiment, the user may press or touch "cancel" icon 828 to exit the screen window 822. An optional virtual keyboard 830 depending the type of client device may be displayed allowing the user to enter the information.

Figures 9A, 9B:
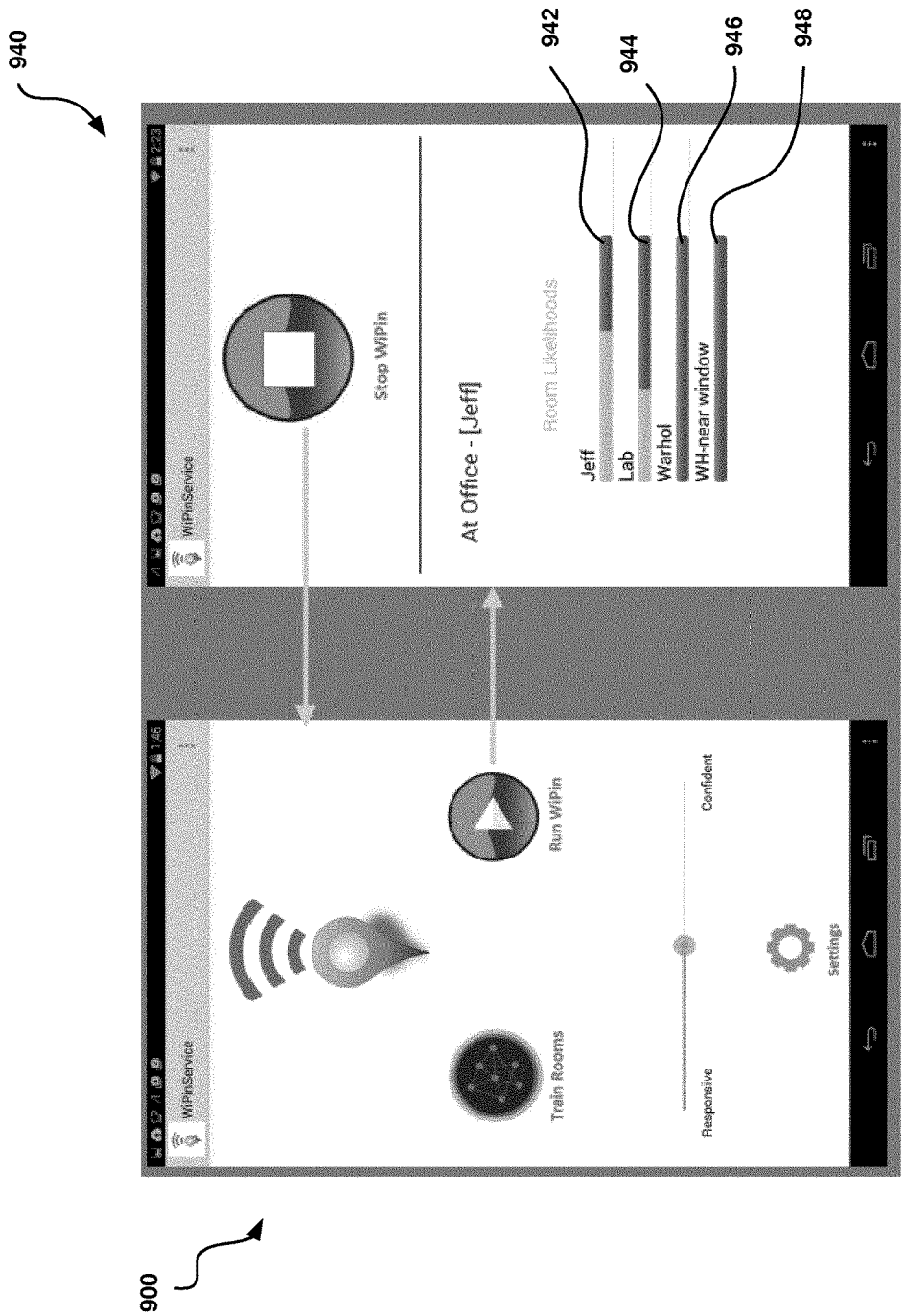
FIGS. 9A-9C illustrate another GUIs according to an embodiment of the disclosure.
Figure 9C:
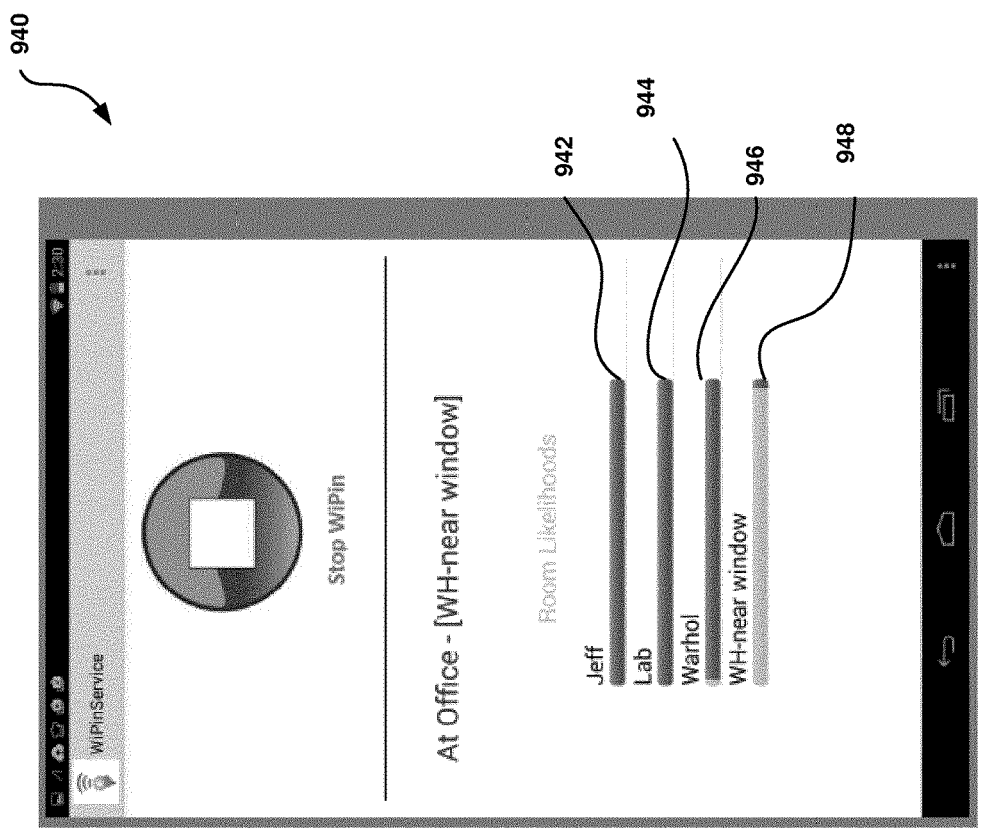

FIGS. 9A-9C illustrate GUI 900, GUI 940, and GUI 960 according to an embodiment of the disclosure. GUI 900 as depicted in FIG. 9A is similar to GUI 400 of FIG. 6A. Once all identified rooms are created and stored in the memory, the user may be able to identify the signal strength level received from multiple access points in a certain room. For example, when the user having the client device is moved from one room (i.e. kitchen) to another room (i.e. room "Jeff"), the signal strength level at indicator 942 represents the strongest, followed by the signal strength level at indicator 944 represented second strongest in the room "Lab". However, indicators 946 and 948 do not depict any signal strength. The no signal strength on indicators 946 and 948 represent the client device is beyond the coverage threshold. As the user leaves room "Jeff" and approaches room "WH", "), the signal strength level at indicator 948 represents the strongest, followed by the signal strength level at indicator 946 represented second strongest in the room "Wahol". However, indicators 942 and 944 do not depict any signal strength. The no signal strength on indicators 942 and 944 represent the client device is beyond the coverage threshold.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An indoor room localization system comprising:
 a memory including training data and response data;
 a processor coupled to the memory, the processor for carrying or having computer-executable instructions to collect WiFi RSSI data corresponding to various sites, the instructions causing a machine to:
  classify the collected WiFi RSSI data into an array of RSSI patterns;
  transmit the classified RSSI patterns to the memory for storing into training data;
  transmit response data identifying classifications of the collected WiFi RSSI data to the memory for storage;
  generate observation vectors from the response data identifying classifications of the collected WiFi RSSI data; and
  update categorical distribution parameters using the generated observation vectors to specify a probability that the machine is within a predetermined region; and
 wherein a dirichlet distribution is used to classify the collected WiFi RSSI data into an array of RSSI patterns and a mode of the dirichlet distribution is used to specify the probability that the machine is within the predetermined region.

2. The indoor room localization system of claim 1 wherein the instructions further causing the machine to use the response data stored in the memory to specify the probability that the machine is within the predetermined region.

3. The indoor room localization system of claim 1, wherein the processor is integrated into a client device.

4. The indoor room localization system of claim 2, wherein the memory is located on a cloud network.

5. The indoor room localization system of claim 1 wherein a support vector machine (SVM) is used to classify the collected WiFi RSSI data into an array of RSSI patterns.

6. The indoor room localization system of claim 5, wherein the processor is integrated into a client device.

* * * * *